Figures 1, 2:
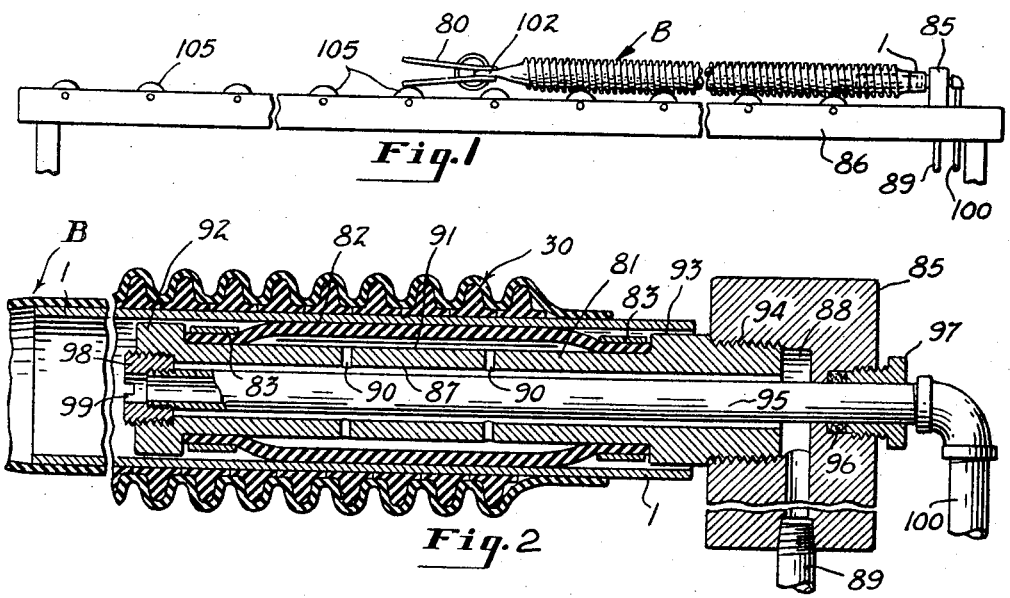

June 2, 1959    V. M. KRAMER ET AL    2,888,712

APPARATUS FOR USE IN MAKING RUBBER TUBING

Original Filed Sept. 21, 1953

INVENTORS
*Vance M. Kramer*
*Lawrence W. Carlton*
BY *Schramm and Knowles*
ATTORNEYS United States Patent Office 2,888,712
Patented June 2, 1959

2,888,712

APPARATUS FOR USE IN MAKING RUBBER TUBING

Vance M. Kramer, Cleveland, and Lawrence W. Carlton, North Baltimore, Ohio

Original application September 21, 1953, Serial No. 381,258. Divided and this application December 16, 1954, Serial No. 478,439

2 Claims. (Cl. 18—19)

This invention relates to apparatus and equipment used in making ridged or corrugated rubber tubing and the like. More particularly the invention is concerned with the making of rubber tubing having a continuous spiral corrugation by a "cording" process, in which a flexible tensile element or cord is wrapped spirally about rubber or other stock carried by an elongated rotatable mandrel, the pressing or squeezing of the stock against the mandrel by the tension in the cord resulting in the formation of a spiral groove in the stock which is held by the cording element during curing of the tube.

In the making of corrugated tubing by the "cording" process as heretofore practiced the supporting of the internal mandrel or form during assembling thereover of the raw rubber extruded tubing and the removing of the cured tube have not been entirely satisfactory.

In accordance with one process for making rubber tubing, with which process the apparatus of the present invention can be used to advantage as set forth in co-pending application for Patent Serial No. 381,258 filed September 21, 1953 now Patent 2,832,096, dated April 29, 1958 and of which application this is a division, the interior of the corrugated tube is shaped by a contoured internal rigid mandrel.

One of the principal objects of the present invention is to provide an improved apparatus for use in assembling seamless raw or partially cured rubber tubing over an elongated mandrel to be used as an internal form for shaping such tubing to corrugated or any other desired configuration. It is contemplated, as a preferred arrangement, to support the internal mandrel or form from or at one end, cantilever fashion, by receiving such one end in telescopic relation to a support from which the mandrel is readily separated for further processing of the tubing.

Other objects and advantages pertain to certain novel combinations and arrangements of apparatus parts and features of construction as set forth in the following detailed description of the invention made in connection with the accompanying drawings forming a part of the specification.

In the drawings:

Fig. 1 is a foreshortened fragmentary diagrammatic elevational view showing preferred apparatus used in removing or expressing a molded corrugated tube from an internal form by "blow off" procedure using internal air pressure; and Fig. 2 is a foreshortened longitudinal sectional view of the right-hand end of the tube removing apparatus of Fig. 1 showing the construction of the cantilever support which receives the tubular internal form or mandrel and effects a seal therewith.

To make corrugated rubber tubing in accordance with the principles of the present invention there is first provided a blank B of rubber or the like, in the form of an elongated cylindrical tube having a wall of uniform thickness, or substantially so. This blank is formed conventionally as by extruding raw or partially cured rubber compound through a suitable die in an extrusion press or auger machine in accordance with well known practice. The outside diameter of the tube blank B is slightly less than the maximum diameter of the corrugated tubing to be formed so that the tube blank is slightly distended when it is drawn over the mandrel and core strip, as will appear. The tube blank is cured while held in the desired corrugated shape by an internal form here shown for illustrative purposes as a mandrel of uniform section carrying a helical core strip as described in the patent referred to. The blank is "corded" in place by a suitable tensile element or cord wrapped about the tube blank and the internal mandrel form.

It is feasible, of course, manually to draw the tube blank over the mandrel and then manually to wrap the tension element or cord about the blank to press the latter into the channels between the core strip convolutions and thereby form the desired corrugations. Preferably, however, the specialized equipment of the present invention is used to support the mandrel, first to assemble the raw rubber tube blank telescopically over the mandrel, then in removing the corrugated tubing after the curing. Commercial operations are more economical and are more adapted to rubber plant operations when the specialized machinery and apparatus of the present invention are used.

The mandrel or support, indicated generally at 1, may take the form of a steel tube of uniform section the length of which is determined by practical considerations governing the handling of the mandrel in the plant, accommodating it in an autoclave, open steam or other heater during the curing process, and the matter of supporting the mandrel at its ends without objectionable center deflection under the loads applied as during the "cording" operation.

A core strip 30 of rubber is wrapped helically about the mandrel 1 to form an internal support of the desired corrugated shape for supporting the rubber tube blank B during the curing of the latter. To assemble the tube blank B over the internal support, the latter is supported cantilever fashion on the device of the present invention, the present support comprising a horizontally disposed spindle 81 over which the tubular mandrel 1 is received. The tube blank is then drawn axially over the internal form, conformed to the spiral corrugated shape of the latter by a cord wrapped about the assembly under tension to draw the tube blank into the groove of the spiral corrugation. The tube is then cured in open steam while held in the corrugated form. Thereafter the cured tube is cooled, the cord unwrapped and the completed tubing is stripped from the internal form using the supporting device of the present invention.

In the simplified version of the present process, and that which is preferred, especially for smaller size corrugated tubing, say under about 4 inches in external diameter, or in making tubing having relatively shallow corrugations, the tubing after curing is removed or stripped from the internal form or mandrel by fluid pressure. The end of the tubing which projects beyond one end of the internal form is pinched together as by a clamp 80, Fig. 1, which seals such tubing end. The internal form or mandrel, embraced by the molded tube, is then supported cantilever fashion on a horizontal spindle 81. This spindle is received internally of the hollow mandrel 1 and has a reduced diameter central portion about which is received an inflatable rubber gland 82 that can be expanded into sealing engagement with the internal surface of the tubular mandrel.

Desirably the spindle 81 is formed centrally or intermediate its ends with a reduced diameter portion 91 about which is received the expansible tubular gland 82, the ends of the latter being cemented to or held sealingly against the spindle by embracing clamps or rings 83. One end of the spindle 81 is formed with external threads 94 and is screwed into a threaded socket formed in post support 85 carried by a table or bench structure 86 formed of steel members welded or otherwise suitably fastened together.

A longitudinal passage 87 extending axially through the spindle 81 communicates with an internal chamber 88 in the upright post support 85 so as to receive air or other fluid under pressure of the order of from about 20 to about 90 pounds per square inch introduced into such chamber as through conduit 89 under the control of a suitable valve. The control valve may, for example, be a foot operated valve capable of being locked in either open or closed position and positioned conveniently for manipulation by an operator standing intermediate the ends of the table 86 adjacent the free or tube receiving end of the internal form or mandrel 1 carried cantilever fashion on the spindle 81. Radial openings 90 through the walls of the spindle 81 in that portion 91 of the latter carrying the expansible gland 82 admits air or other high pressure fluid from the central passage 87 to inflate the gland 82 and expand the latter strongly against the inside of the tubular mandrel 1 and thereby establish a seal. The frictional engagement between the parts resists relative axial movement of the mandrel or internal form and the seal prevents escape of air or other fluid introduced into the interior of the mandrel or internal form for the purpose of releasing or blowing off the cured tube, as will appear.

The positioning of the deformable tubular gland 82 about the reduced diameter portion 91 permits the spindle 81 to be formed with end portions 92 and 93 that have close sliding fits in the tubular mandrel 1 so as to support the latter with minimum deflection, the cantilevered internal form or mandrel thus extending horizontally over the table or support structure 86 in predetermined spaced relation to and above the latter. A "blow off" air supply tube 95 made of conventional steel pipe extends axially through the passage 87 in the spindle 81, this tube being projected through the support chamber 88 and through an opening in the support which is sealed by suitable packing 96 and packing nut 97. At the free end of the spindle 81 the passage 87 is closed by a threaded metal plug 98 formed with an axial passage 99 threaded to receive in sealing relation the threaded end of the supply tube 95. The passage 87 is thus sealed at one end by the plug 98 and at the other end by the structure associated with the support 85 so that high pressure air or fluid introduced into the support chamber 88 is forced inflatingly into the gland 82. The supply conduit 95, projected axially through the spindle 81, introduces high pressure fluid into the interior of the internal form or mandrel 1 supported or cantilevered on the spindle 81. Air or other high pressure fluid, say of the order of from about 20 to about 90 pounds per square inch, is supplied to the conduit 95 by suitable pipe conduits 100 and is under the control of a suitable normally closed spring biased valve such as a foot operated valve located convenient to the operator near the valve which controls the supply of fluid to inflate the gland 82.

When an internal form or mandrel carrying a cured corrugated tube is mounted on the spindle 81, cantilever fashion, the cord having previously been removed as by unwrapping, the operator closes end 102 of the tube blank B which projects over the free end of the internal form or mandrel. The closure is effected as by a pinch type clamp 80 which collapses the tube end and thereby seals the tube. The operator then actuates the valve for introducing high pressure fluid through the conduit 89 and the interior of the spindle 81 to inflate and expand the gland 82 and thereby seal the internal form or mandrel on the spindle while preventing longitudinal movement by reason of the frictional engagement between the expanded gland and the internal surface of the tubular mandrel 1. With the mandrel or form thus sealed or secured on the spindle 81 the operator actuates the valve to admit high pressure fluid through the supply conduit 95 into the interior of the mandrel. Thus the tubular mandrel 1 serves as a conduit carrying high pressure air or fluid from the supply conduit 95 in the support spindle 81 along the full length of the internal form to the end of the latter over which the molded or cured rubber tube is closed and sealed by the clamp 80. The internal pressure thus applied to the cured tube at one end of the internal form serves partially to inflate the cured tube and free the tube from the external surface of the form on which the curing of the tube took place.

It is apparent that the spirally arranged core strip 30 provides a continuous channel between adjacent turns of the ridge or crest portion of the core strip, this channel extending helically around the internal form or mandrel throughout the entire length of the corrugated portion of the cured tubing. One end of the core strip channel is in communication with the space or chamber at the closed end 102 of the tube occasioned by inflation of such tube end, so that the high pressure inflating fluid moves readily into the entering end of the core strip channel and flows readily along such channel, progressively freeing the corrugated rubber tube from the mandrel or form on which the curing took place.

As the spiral migration of the internal air or fluid pressure effects complete freeing or separating of the molded tube convolutions from the internal mandrel or form, the continued application of the fluid pressure forces the inflated distended tube off the free end of the internal form. This relative axial separation of the tube from the form is aided by suspending the mandrel vertically or, as shown, by providing suitable support for the molded tube at spaced points along its length. Such support may desirably take the form of a plurality of parallel rolls 105 journaled in the table structure 86 to turn on antifriction bearings about parallel axes spaced along the length of the table. The roller axes are so oriented as to be generally transverse to the line of travel of the molded tube during the "blow off" procedure.

In accordance with the patent statutes the principles of the present invention may be utilized in various ways, numerous modifications and alterations being contemplated, substitution of parts and changes in construction being resorted to as desired, it being understood that the apparatus shown in the drawings and described above is given merely for purposes of explanation and illustration without intending to limit the scope of the claims to the specific details disclosed.

What we claim and desire to secure by patent is:

1. Apparatus for use in making corrugated rubber tubing comprising in combination an elongated tubular form having a spirally corrugated external surface for shaping the interior of a rubber tube blank telescoped over the form, a mounting head comprising a rigid tubular member, a resilient sleeve embracing the tubular member, the ends of the sleeve being sealed to permit inflation of the sleeve, the mounting head being receivable within one end of the tubular form in telescopic interfitting relation, a structure supporting the head with the interfitted form projecting substantially horizontally therefrom in cantilever fashion, means connected to the sleeve through the rigid tubular member and operative to supply fluid under pressure to inflate the sleeve against the telescoped form end in establishing both a frictional grip and a fluid tight seal between the mounting head and an interfitted form, and means connected through the rigid tubular member and operative to supply fluid through the seal and into the interior of the tubular form whereby fluid under pressure is conducted through the interior of the form to the end of the latter remote from the interfitted end for use in expressing tubing from the cantilevered form by internal fluid pressure.

2. Apparatus for use in making corrugated rubber tubing comprising in combination an elongated tubular form having a spirally corrugated external surface for shaping the interior of a rubber tube blank telescoped over the form, a mounting head comprising a rigid tubular member having end portions of circular section and between the end portions a reduced portion of less cross sectional area than the end portions, a resilient sleeve embracing the reduced portion of the tubular member, the ends of the sleeve being sealed to permit inflation of the sleeve, the mounting head being receivable within one end of the tubular form in telescopic interfitting relation, a structure supporting the head with the interfitted form projecting substantially horizontally therefrom in cantilever fashion, means connected to the sleeve through the rigid tubular member and operative to supply fluid under pressure to inflate the sleeve against the telescoped form end in establishing both a frictional grip and a fluid tight seal between the mounting head and an interfitted form, the interfitted form being engageable with the end portions of the rigid member for direct support at points spaced axially from both ends of the gland, and means connected through the rigid tubular member and operative to supply fluid through the seal and into the interior of the tubular form whereby fluid under pressure is conducted through the interior of the form to the end of the latter remote from the interfitted end for use in expressing tubing from the cantilevered form by internal fluid pressure.

References Cited in the file of this patent

UNITED STATES PATENTS

| | | |
|---|---|---|
| 2,099,843 | Connell | Nov. 23, 1937 |
| 2,217,213 | Bratring | Oct. 8, 1940 |
| 2,267,815 | Bush | Dec. 30, 1941 |
| 2,361,026 | Greene | Oct. 24, 1944 |
| 2,568,128 | Morris | Sept. 18, 1951 |
| 2,779,996 | Tanis | Feb. 5, 1957 |

FOREIGN PATENTS

| | | |
|---|---|---|
| 194,748 | Canada | Dec. 9, 1919 |